(12) United States Patent
Zhu et al.

(10) Patent No.: US 11,082,622 B2
(45) Date of Patent: Aug. 3, 2021

(54) SYSTEMS AND METHODS FOR DYNAMICALLY SWITCHING IMAGE SIGNAL PROCESSOR CONFIGURATIONS

(71) Applicant: Nuro, Inc., Mountain View, CA (US)

(72) Inventors: Fei Zhu, Pleasanton, CA (US); Wei Liu, Sunnyvale, CA (US); James N. Vines, San Francisco, CA (US)

(73) Assignee: NURO, INC., Mountain View, CA (US)

(*) Notice: Subject to any disclaimer, the term of this patent is extended or adjusted under 35 U.S.C. 154(b) by 41 days.

(21) Appl. No.: 16/713,211

(22) Filed: Dec. 13, 2019

(65) Prior Publication Data

US 2021/0185210 A1 Jun. 17, 2021

(51) Int. Cl.
*H04N 5/235* (2006.01)
*G06K 9/00* (2006.01)
*H04N 5/247* (2006.01)

(52) U.S. Cl.
CPC ....... *H04N 5/2351* (2013.01); *G06K 9/00791* (2013.01); *H04N 5/247* (2013.01)

(58) Field of Classification Search
None
See application file for complete search history.

(56) References Cited

U.S. PATENT DOCUMENTS

| 2015/0237280 | A1* | 8/2015 | Choi | H04N 5/374 348/308 |
|---|---|---|---|---|
| 2017/0185871 | A1 | 6/2017 | Zhang et al. | |
| 2017/0257548 | A1* | 9/2017 | Tamai | G06T 7/85 |
| 2018/0343382 | A1* | 11/2018 | Cohen | H04N 5/0733 |
| 2019/0005360 | A1 | 1/2019 | Heide | |
| 2019/0052792 | A1* | 2/2019 | Baba | G06K 9/00832 |
| 2019/0250630 | A1* | 8/2019 | Zhao | G05D 1/0246 |
| 2019/0340924 | A1* | 11/2019 | Abari | G08G 1/09623 |
| 2020/0001774 | A1* | 1/2020 | Kim | G06K 9/00791 |
| 2021/0065473 | A1* | 3/2021 | Diehl | G07C 5/0808 |

FOREIGN PATENT DOCUMENTS

CN 109284719 A 1/2019

* cited by examiner

*Primary Examiner* — Heather R Jones (57) ABSTRACT

The present disclosure relates to image signal processor configurations. In accordance with aspects, a system includes at least one image signal processor, a first camera configured to cooperate with the image signal processor(s) to capture images of an environment around a vehicle, and a second camera configured to cooperate with the image signal processor(s) to capture images of the environment, where the second camera and the first camera are mounted to the vehicle in the same direction. The image signal processor(s) is configured to transition from capturing images of a field of view using an active image signal processor (ISP) configuration to capturing images of the field of view using a matched image signal processor (ISP) configuration which is different from the active ISP configuration. The transition includes simultaneously using the first camera and the second camera and includes simultaneously using the active ISP configuration and the matched ISP configuration.

20 Claims, 6 Drawing Sheets

SYSTEMS AND METHODS FOR DYNAMICALLY SWITCHING IMAGE SIGNAL PROCESSOR CONFIGURATIONS

FIELD OF THE TECHNOLOGY

The present application relates to image capture, and in particular, to image capture parameters that dynamically transition to adjust to changing environmental light conditions.

BACKGROUND

The field of fully-autonomous and/or semi-autonomous vehicles is a growing field of innovation. Autonomous vehicles are being used for many purposes including warehouse inventory operations, household vacuuming autonomous vehicles, hospital delivery autonomous vehicles, sanitation autonomous vehicles, and military or defense applications. While performing various tasks, autonomous vehicles process data from many sensors, such as image data captured by image sensors.

Image capture and image signal processing are challenging tasks, especially when autonomous vehicles rely on them for safe operation. Certain technologies, such as auto exposure, auto zoom, and the like, have been used in photography devices to self-adjust and obtain clearer images. Further, post image processing can be used after capturing images to improve image clarity.

There is continuing interest in improving image signal processing in connection with autonomous vehicles or robots to enhance operational safety.

SUMMARY

The present disclosure relates to systems and methods for image capturing that self-adjusts based on environmental light and that adjusts in a manner which reduces safety risks. Aspects of the present disclosure are applicable to vehicles that travel through different environmental light conditions where a single imaging configuration may not be suitable for some of the different light condition.

In accordance with aspects of the present disclosure, a system includes at least one image signal processor, a first camera configured to cooperate with the image signal processor(s) to capture images of an environment around a vehicle, and a second camera configured to cooperate with the image signal processor(s) to capture images of the environment, where the second camera and the first camera are mounted to the vehicle in the same direction. The image signal processor(s) is configured to transition from capturing images of a field of view using an active image signal processor (ISP) configuration to capturing images of the field of view using a matched image signal processor (ISP) configuration which is different from the active ISP configuration. The transition includes simultaneously using the first camera and the second camera and includes simultaneously using the active ISP configuration and the matched ISP configuration.

In various embodiments of the system, the system includes a detector configured to capture environmental light of the environment, and a memory storing a plurality of image signal processor configurations. The matched ISP configuration is selected from among the plurality of image signal processor configurations based on the captured environmental light. In various embodiments of the system, the system includes a trained learning machine that classifies the environment based on the captured environmental light, where the matched ISP configuration is selected from among the plurality of image signal processor configurations based on the classification.

In various embodiments of the system, for a time period during the transition from capturing images using the active ISP configuration to capturing images using the matched ISP configuration, the first camera cooperates with the at least one image signal processor to capture first images of the field of view based on the active ISP configuration and, simultaneously, the second camera cooperates with the at least one image signal processor to capture second images of the field of view based on the matched ISP configuration. In various embodiments of the system, the system includes a trained learning machine configured to process the first images of the field of view and the second images of the field of view to identify an object in the field of view. In various embodiments of the system, the trained learning machine provides a first identification for the object based on the first images and provides a second identification for the object based on the second images, where the first identification is different from the second identification.

In various embodiments of the system, for a second time period during the transition that is after the time period, the first camera cooperates with the at least one image signal processor to capture images of the field of view based on the matched ISP configuration, and, simultaneously, the second camera cooperates with the at least one image signal processor to capture images of the field of view based on the matched ISP configuration. In various embodiments of the system, for a third time period during the transition that is after the second time period, the second camera is deactivated.

In various embodiments of the system, for a second time period during the transition that is after the first time period, the first camera is deactivated.

In accordance with aspects of the present disclosure, a method includes capturing, by a first camera in cooperation with at least one image signal processor, images of an environment around a vehicle, and capturing, by a second camera in cooperation with the at least one image signal processor, images of the environment around the vehicle, where the second camera and the first camera are mounted to the vehicle in the same direction. The method includes transitioning from capturing images of a field of view using an active image signal processor (ISP) configuration to capturing images of the field of view using a matched image signal processor (ISP) configuration that is different from the active ISP configuration, where the transitioning includes simultaneously using the first camera and the second camera and includes simultaneously using the active ISP configuration and the matched ISP configuration.

In various embodiments of the method, the method includes capturing, by a detector, environmental light of the environment, accessing a memory storing a plurality of image signal processor configurations, and selecting the matched ISP configuration from among the plurality of image signal processor configurations based on the captured environmental light. In various embodiments of the method, the method includes classifying the environment based on the captured environmental light using a trained learning machine, where selecting the matched ISP configuration includes selecting the matched ISP configuration from among the plurality of image signal processor configurations based on the classification.

In various embodiments of the method, the transitioning from capturing images using the active ISP configuration to capturing images using the matched ISP configuration includes, for a time period during the transition, capturing first images of the field of view by the first camera cooperating with the at least one image signal processor based on the active ISP configuration, and, simultaneously, capturing second images of the field of view by the second camera cooperating with the at least one image signal processor based on the matched ISP configuration. In various embodiments of the method, the method includes processing the first images of the field of view and the second images of the field of view, by a trained learning machine, to identify an object in the field of view. In various embodiments of the method, the trained learning machine provides a first identification for the object based on the first images and provides a second identification for the object based on the second images, where the first identification is different from the second identification.

In various embodiments of the method, the transitioning from capturing images using the active ISP configuration to capturing images using the matched ISP configuration includes, for a second time period during the transition that is after the time period, capturing images of the field of view by the first camera cooperating with the at least one image signal processor based on the matched ISP configuration, and, simultaneously, capturing images of the field of view by the second camera cooperating with the at least one image signal processor based on the matched ISP configuration. In various embodiments of the method, the transitioning includes, for a third time period during the transition that is after the second time period, deactivating the second camera.

In various embodiments of the method, the transitioning includes, for a second time period during the transition that is after the time period, deactivating the first camera.

In accordance with aspects, the present disclosure includes a non-transitory computer readable medium of a system having a first camera, a second camera, and at least one image signal processor. The computer readable medium includes instructions which, when executed by the at least one image signal processor, cause the system to perform a process that includes capturing, by the first camera in cooperation with at least one image signal processor, images of an environment around a vehicle, capturing, by the second camera in cooperation with the at least one image signal processor, images of the environment around the vehicle, where the second camera and the first camera are mounted to the vehicle in the same direction, and transitioning from capturing images of a field of view using an active image signal processor (ISP) configuration to capturing images of the field of view using a matched image signal processor (ISP) configuration that is different from the active ISP configuration. The transitioning includes simultaneously using the first camera and the second camera and includes simultaneously using the active ISP configuration and the matched ISP configuration.

In various embodiments, the transitioning from capturing images using the active ISP configuration to capturing images of the field of view using the matched ISP configuration includes, for a time period during the transition, capturing images of the field of view by the first camera cooperating with the at least one image signal processor based on the active ISP configuration, and, simultaneously, capturing images of the field of view by the second camera cooperating with the at least one image signal processor based on the matched ISP configuration.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

This disclosure relates to adjusting image capturing and/or image signal processing parameters in a vehicle based on environmental light conditions. By appropriately tuning image signal processing parameters, a vehicle may be able to better recognize objects with higher accuracy and consequently reduce pedestrians or other potential collisions, among other benefits.

In accordance with aspects of the present disclosure, and referring to FIG. 1, an exemplary fully-autonomous or semi-autonomous vehicle (hereinafter "autonomous vehicle") is illustrated. The autonomous vehicle 100 is equipped with an image signal processor, which is capable of capturing images under various environmental light conditions (e.g., sunny, dark, tunnel, etc.) The autonomous vehicle 100 also includes an energy absorbing system 1200, which includes energy absorbing members to reduce impact on objects that come in contact with the autonomous vehicle 100. Aspects of the energy absorbing members and pedestrian safety mechanisms are described in U.S. Patent Application Publication No. US-2019-0054876-A1, which is hereby incorporated by reference herein in its entirety.

As used herein, the term "vehicle" encompasses machines that can carry a person as well as machines that do not carry and/or are not configured to carry a person, and also encompasses machines that may be fully autonomous and/or that are partly or wholly controlled by a human, either part of the time or at all times. In various embodiments, a vehicle can be configured for transporting, delivering, or retrieving goods or services and is capable of operating in an unstructured open or closed environment. In various embodiments, a vehicle can be configured to transport cargo, items, goods, and/or persons. A vehicle can be a robot, a land automobile, an aircraft, and/or a watercraft. Types of vehicles can include cars, wagons, vans, manned or unmanned motor vehicles, trucks, trailers, buses, manned or unmanned rail vehicles (e.g., trains, trams, etc.), manned or unmanned aircraft, and manned or unmanned watercraft. A vehicle can be shaped and dimensioned to operate indoors, such as within a building, or outdoors, such as on land, on water, and/or in the air. For convenience, a land vehicle is illustrated in FIG. 1 and will be used herein as an example of aspects of the present disclosure. However, such example is non-limiting, and it is contemplated that other types of vehicles are within the scope of the present disclosure.

As used herein, the term "autonomous" includes fully-autonomous, semi-autonomous, and any configuration in which a vehicle can operate in a controlled manner for a period of time without human intervention.

As used herein, the term "server," "computer server," "central server," "main server," and like terms are used to indicate a computer or device on a network that manages the resources of the autonomous vehicle. As used herein, the term "controller" and like terms are used to indicate a device that controls the transfer of data from a computer to a peripheral device and vice versa, and/or a device that performs computational processing. For example, disk drives, display screens, keyboards, and printers all require controllers. In personal computers, the controllers are often single chips. As used herein, the controller is commonly used for managing access to components of the autonomous vehicle such as the securable compartments.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the autonomous vehicle.

Figure 2:
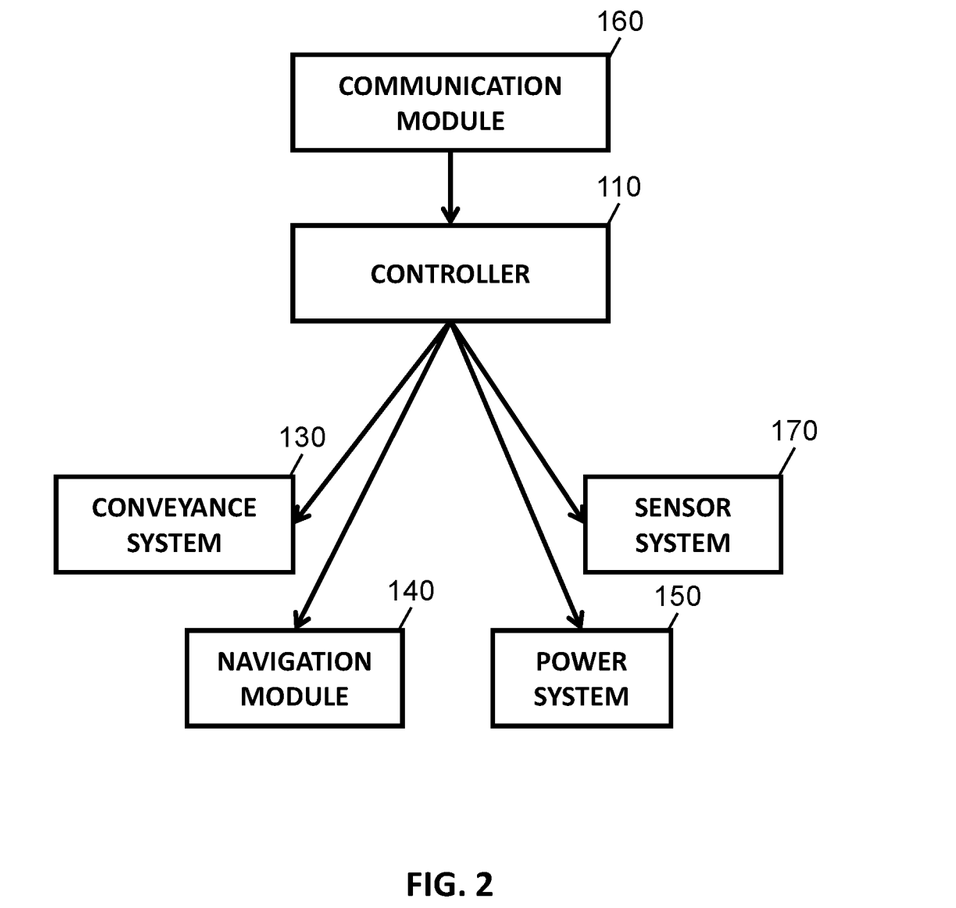
FIG. 2 is a block diagram of exemplary various systems of an autonomous vehicle, in accordance with aspects of the present disclosure.

Referring to FIG. 2, the autonomous vehicle 100 includes a vehicle controller 110, the conveyance system 130, a navigation module 140, a power system 150, a communication module 160, and a sensor system 170. The vehicle controller 110 may be embodied as analog, digital, or mixed analog and digital processing circuitry and memory that direct the operation of the autonomous vehicle 100, the electromechanical conveyance system 130, and the navigation module 140 of the autonomous vehicle 100. The vehicle controller 110 is an embedded real-time control system in which control outputs are produced in response to control input conditions. The vehicle controller 110 is configured to use feedback from sensor systems 170 and the conveyance system 130, for example, to develop an appropriate response when, for example, the autonomous vehicle 100 encounters an obstacle such as, e.g., a pedestrian. The vehicle controller 110 may be integrated with the conveyance system 130 of the autonomous vehicle 100 in any suitable manner to permit the vehicle controller 110 to control the operations of the autonomous vehicle 100, including the acceleration, braking, or turning. The vehicle controller 110 may be electrically, mechanically, and/or electromechanically integrated with the conveyance system 130 and the other elements of the autonomous vehicle 100.

In various embodiments, the controller 110 may determine where the autonomous vehicle 100 can safely travel, what other objects are around the vehicle based on results from the sensor system 170, and what the vehicle may do within its immediate surroundings. The controller 110 may control the power system 150 and the navigation module 140 in driving the autonomous vehicle 100. Furthermore, the controller 110 may cooperate with the communication module 160 to provide or obtain data to and from other autonomous vehicles, a management server, a global positioning server (GPS), a personal computer, a smartphone, or any computing device via the communication module 160.

The conveyance system 130 may be embodied as the powertrain and associated electrical, mechanical, hydraulic, electromechanical, control, and/or diagnostic systems of the autonomous vehicle 100. Thus, the conveyance system 130 may include one or more transmissions, steering, braking, and/or other systems to control the movement of the autonomous vehicle 100 on surface streets, parking lots, off-road surfaces, within a building, etc. The conveyance system 130 operates the autonomous vehicle 100 at the direction of the vehicle controller 110. The conveyance system 130 may be a drive system with wheels, treads, wings, rotors, blowers, rockets, propellers, brakes, etc. As noted previously, the autonomous vehicle 100 is configurable for land. In some embodiments, the autonomous vehicle 100 may be configured for hover travel as an over-land hovercraft or an air-cushion vehicle (ACV) and is configured with blowers to produce a large volume of air below the hull that is slightly above atmospheric pressure.

The power system 150 provides one or more power sources and power generators of the autonomous vehicle 100. In various embodiments, the power system 150 can include one or more of a battery, solar panels, gasoline, propane, and/or other fuel or fuel reservoirs, and can include one or more engines or motors. In various embodiments, the engine or motor can be a gas engine, a turbine engine, an electric motor and/or a hybrid gas/electric engine system.

The navigation module 140 provides for navigation in structured or unstructured open or closed environments. In some embodiments, the navigation module 140 may utilize on publicly available maps. In some embodiments, the navigation module may utilize private or customized maps that specifically cover an environment where the autonomous vehicle 100 is intended to operate. In some embodiments, for navigation, the autonomous vehicle 100 may use internal maps to provide information about where the autonomous vehicle 100 is going and the structure of the road environment. In various embodiments, the autonomous vehicle 100 may incorporate on-line maps to augment internal maps. These maps would then be used for travel guidance in determining a route for traveling from one location to another. In some embodiments, the autonomous vehicle 100 may rely on a GPS that allows land, sea, and airborne vehicles to determine their location, velocity, and time anywhere in the world.

In various embodiments, the communication module 160 is configured to obtain, store, and provide data to and from a management system (not shown) which manages autonomous vehicles. In some embodiments, the communication module 160 can communicate with other autonomous vehicles. In various embodiments, the communications occur by wireless communications such as cellular communications (e.g., 3G, 4G, 5G, or the like). In various embodiments, the communication could occur via satellite communication systems.

With continuing reference to FIG. 2, the sensor system 170 may include various sensors, such as cameras, three-dimensional (3D) laser scanners, laser illuminated detecting and ranging sensors (LIDAR), radar, range scanners, and/or 3D depth sensing devices, which may be relied upon to analyze the surrounding environment, develop control signals for operating the conveyance system 130, detect an occurrence of an event (e.g., a car accident), and/or perform other actions. In various embodiments, the sensor system 170 may include a radiant energy detector that detects, for example, infrared, radar, laser radar, laser, and/or microwave. In various embodiments, the sensor system 170 may include a sonic detector that detects ultrasonic and/or acoustic waves. In various embodiments, laser radar is used to benefit from narrower beam width and greater angular resolution, as the laser radar gives more specific and precise information of detected obstacle's direction, distance, size and/or relative speed. The data obtained by the sensor system 170 is processed by the vehicle controller 110 for various purposes.

Figure 1:
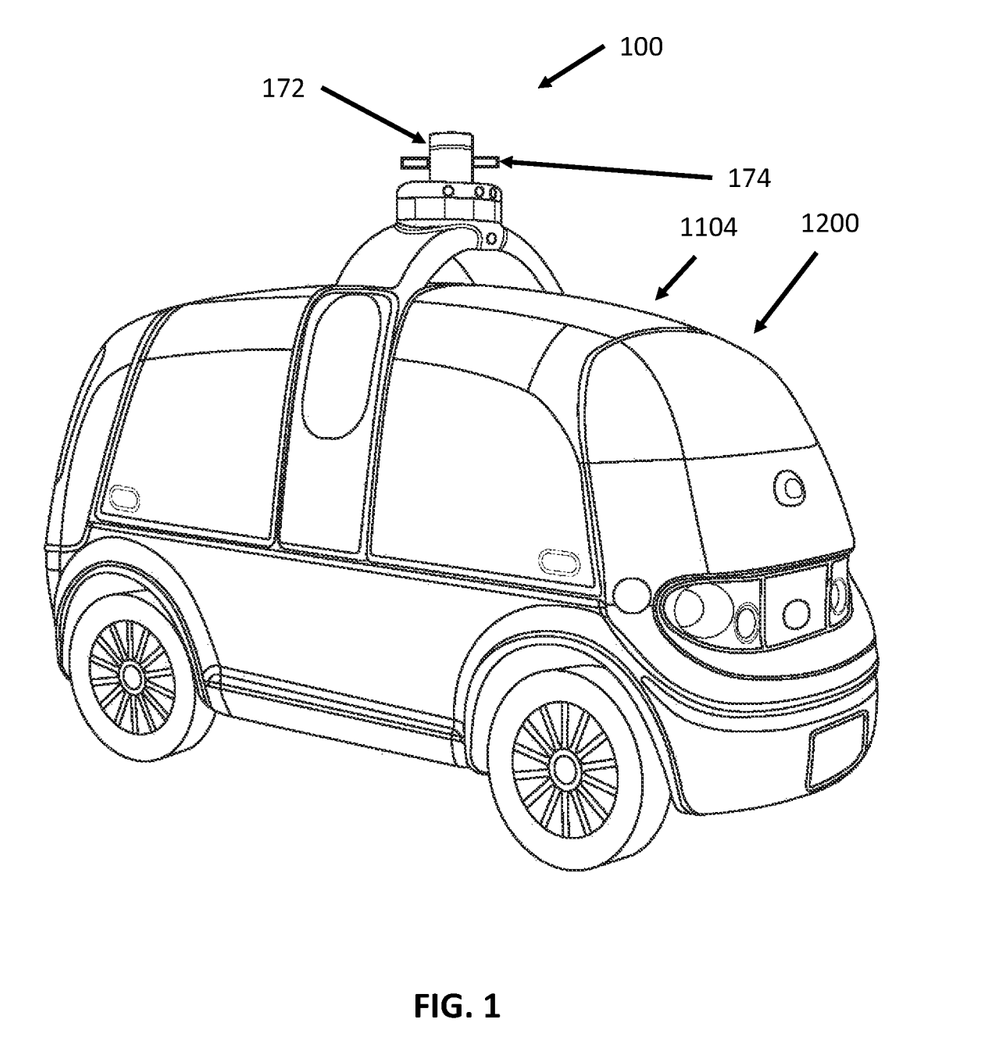
FIG. 1 is a perspective view an exemplary autonomous vehicle, in accordance with aspects of the present disclosure.

With reference also to FIG. 1, and in accordance with aspects of the present disclosure, the sensor system 170 (FIG. 2) includes a plurality of image sensors 172, which may be located on the top of the autonomous vehicle 100. The image sensors 172 may capture the environment surrounding the autonomous vehicle 100. The image sensors 172 may include sufficient number of cameras so that their field of view can cover every direction around the autonomous vehicle 100. Thus, the number of cameras may be determined based on a field of view of each camera. Each camera may be associated with settings for image signal processing (ISP) parameters that are used to cooperate with the camera to provide images. In various embodiments, such ISP parameters are used to enhance quality of the images. In various embodiments, the image sensors 172 may be coupled with a steering mechanism of the autonomous vehicle 100. In various embodiments, the steering mechanism can be a steering wheel or another mechanism which operates to steer the wheels of the autonomous vehicle 100. As the steering mechanism turns the wheels, the image sensors 172 may be correspondingly turned to maintain its target direction generally parallel with the direction of the front wheels of the autonomous vehicle 100. This results in the forward beam inspecting the vicinity of the turn into which the autonomous vehicle 100 embarks. In embodiments, the image sensors 172 may include an omni-directional camera, which does not need to turn. Thus, as the steering mechanism turns wheels, the image signal processor may focus on a portion of the image that corresponds to the steering direction.

In accordance with aspects of the present disclosure, an image signal processor 300 (FIG. 3) cooperates with the image sensors 172 to capture/provide images of the environment. In various embodiments, the image signal processor 300 can be implemented within the sensor system 170. In various embodiments, the image signal processor 300 can be implemented within the controller 110. In various embodiments, the image process 300 can be distributed across the sensor system 170 and the controller 110. Other implementations are contemplated.

Figure 3:
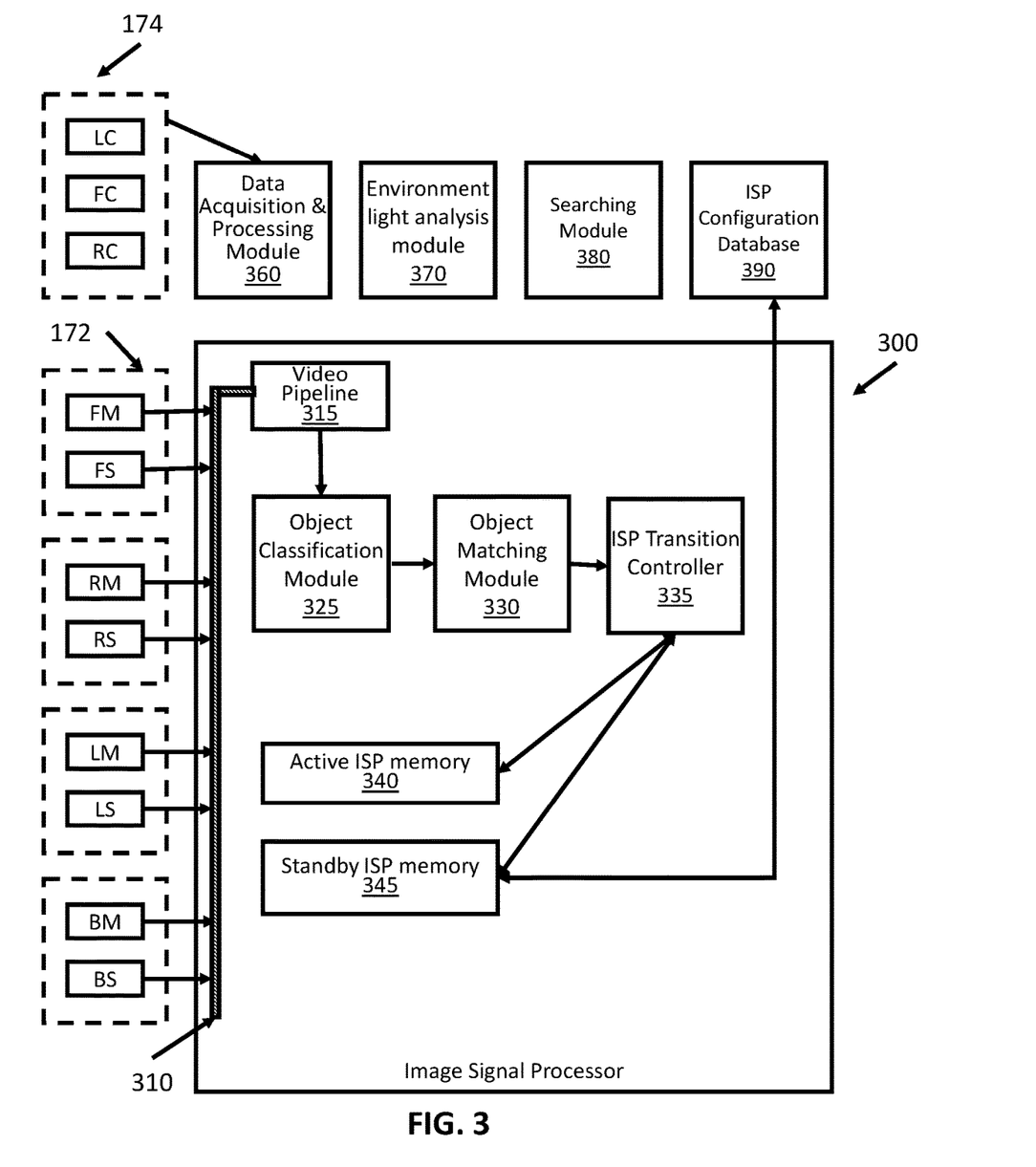
FIG. 3 is a block diagram of an exemplary image capturing and processing system, in accordance with aspects of the present disclosure.

In the process of capturing images, the image signal processor 300 cooperates with the image sensors 172 using settings or parameters related to, without limitation, auto exposure, curve control and adjustment, and automatic white balance (AWB), among other parameters that relate to capturing an image. Such parameters will generally be referred to herein as image signal processing (ISP) parameters. For example, the auto exposure parameters may relate to saturation for still images and videos, exposure tuning table, sharpness, high light target, low it target, brightness value, higher brightness, lower brightness, gamma correction, and/or color effect solarization and posterization, among other imaging characteristics or properties. The curve control and adjustment parameters may relate to LED flash level, flicker correction, noise reduction based on luminance value, noise reduction based on chroma value, and/or lens shading falloff factor, among other imaging characteristics or properties. The AWB parameters may relate to gray line softclamp, gray line slope, gray line intercept, fusion lights, geometric distortion correction, chromatic aberration, color correction srgb-matrix spatial de-noise, optical black manual biasR, optical black manual biasGr, optical black manual biasGB, optical black manual biasB, optical black float manual biasR, HDR, image scaling, and/or de-mosaic Bayer pattern, among other imaging characteristics or properties. The foregoing lists are not intended to be exhaustive but to merely provide examples of ISP parameters. The ISP parameters may include other parameters not expressly enumerated or described herein. Such other parameters will be understood by persons having ordinary skill in the art, and are contemplated to be within the scope of the present disclosure.

For convenience, the present disclosure may refer to a camera that captures images of an environment, or may refer to a camera and image signal processor which cooperate to provide images of an environment. Such descriptions are used interchangeably in the present disclosure, but in either usage, it will be understood that the process of providing an image of the environment involves both a camera and an image signal processor.

Referring again to FIG. 1, the sensor system 170 may further include environmental light detectors 174, which can detect environmental light conditions (e.g., sunny, dark, tunnel, etc.). In various embodiments, the light detectors 174 can include one or more photodiodes and/or charge coupled devices. In various embodiments, the light detectors 174 can be low resolution cameras. The environmental light detectors 174 may be located near the image sensors 172 so that the positional proximity between the image sensors 172 and the environmental light detectors 174 can expose both sensors to similar light conditions. In various embodiments, one or more environmental light detectors 174 may face upward toward the sky so that the actual condition of the ambient light condition surrounding the autonomous vehicle 100 can be determined. In various embodiments, one or more environmental light detectors 174 may not face the sky and may face the same direction as one or more image sensors 172. Based on the detected environmental light, the image signal processor 300 (FIG. 3) can determine whether ISP parameters should be changed to correspond better with the environmental light conditions, as described with respect to FIG. 3 below.

Referring now to FIG. 3, and in accordance with aspects of the present disclosure, there is shown a block diagram of an image capture and processing system, which includes image sensors 172, environmental light detectors 174, an image signal processor 300, and various hardware/software modules 360-390. In the illustrated embodiments, the image sensors 172 include two cameras facing a front direction. One camera is referred to as a front master camera (FM) and the other is referred to as a front slave camera (FS). The illustrated system includes similar cameras in the other directions, including right master camera (RM) and right slave camera (RS), left master camera (RM) and right slave camera (RS), and back master camera (BM) and back slave camera (BS). In various embodiments, the number of directions may be more than or less than four. In various embodiments, the image sensors 172 may include a master omni-directional camera and a slave omni-directional camera.

The environmental light detectors 174 may include a left detector (LC), a front detector (FC), and a right detector (RC). In embodiments, the environmental light detectors 174 may also include a back environmental light detector. These detectors may face upward or may face in the same directions as the image sensors 172. In various embodiments, the number of environmental light detectors 174 may be more than three, and the detectors may face in various directions.

The light amounts detected by the environmental light detectors 174 are converted to electrical signals by the detectors 174, and the electrical signals are processed by a data acquisition and processing module 360. The data acquisition and processing module 360 can, for example, organize the streams of signals from the front, left, and right environmental light detectors into a particular format and/or sequence. In various embodiments, the data acquisition and processing module 360 can control the environmental light detectors 174 to capture signals at a particular capture rate and/or exposure time. For example, exposure times can be higher at night time and lower at day time. To perform such operations, the data acquisition and processing module 360 can be implemented as a combination of hardware together with firmware and/or software. The hardware may include, for example, microcontrollers, digital signal processors, memory, communication buses, and/or ASICs. The firmware or software can include, for example, instructions in the microcontrollers or digital signal processors.

The processed environmental light data is then provided to the environment light analysis module 370, which analyzes the environmental light data to classify the environment that the autonomous vehicle 100 is operating in. For example, the light data from the environmental light detectors 174 may indicate that the vehicle is in a tunnel if the left and right detectors detect low amounts of light while the front detector detects a high amount of light, during day time, or vice versa during night time. As another example, the light data from the environmental light detectors 174 may indicate that the vehicle is operating under tree cover if the right detector detects a low amount of light while the front and left detectors detect high amounts of light. In this manner, the environmental light analysis module 370 can analyze the data obtained from the data acquisition and processing module 360 to classify the environment that the vehicle is operating in. In various embodiments, the environment light analysis module 370 can be implemented by software executing on a processor. In various embodiments, the association of particular light data to a particular environment classification can be predetermined and can be stored in the autonomous vehicle. Such associations between particular light data and a particular environment setting can be pre-formed by statistical analysis of the environmental light data and/or by machine learning, among other techniques. The environment light analysis module 370 can provide the result of its analysis to the searching module 380.

In accordance with aspects of the present disclosure, the searching module 380 operates to identify ISP parameters (or "ISP configuration") that are appropriate and/or optimal for a particular environmental setting, such as a tunnel, tree cover, or another environmental setting. In various embodiments, the searching module 380 can be implemented by software executing on a processor. The searching module 380 can access an ISP database 390 that includes pre-stored ISP configurations. The ISP database 390 and the search module 380 can operate in various ways. For example, each ISP configuration can be associated or tagged with metadata that indicates the environmental settings to which it can be applied. For example, various ISP configurations can be tagged by metadata associated with "tunnel during day time" or "clear sky night time," among others. As another example, other ISP configurations can be tagged with metadata associated with "tree cover during day time," among others. In various embodiments, the search module 380 can search such metadata to identify ISP configurations that may be available for the environmental setting inferred by the environment light analysis module 370. If there are multiple ISP configurations, the searching module 380 can randomly select one or can select one that has been used most frequently, for example. It is contemplated that the searching module 380 can operate in other ways not expressly described herein.

With continuing reference to FIG. 3, each pair of master and slave cameras cooperates with the image signal processor 300 to capture and provide images. The images captured by the master cameras and the slave cameras are communicated over the communication bus 310, which relays the images to the image signal processor 300. The images can be temporarily stored in a video pipeline 315 to await further processing in the image signal processor 300. FIG. 3 is not intended to be comprehensive, and processing may occur in the image signal processor 300 prior to the communication bus 310 or prior to the video pipeline 315 stages. For convenience, the following will describe transitioning between two ISP configurations in connection with operations of the front master and front slave cameras. The following description, however, can also apply to operations of the right cameras (RM, RS), the left cameras (LM, LS), and the back cameras (BM, BS). Accordingly, the features and embodiments described below are not limited to just the operations of the front cameras.

In accordance with aspects of the present disclosure, when an ISP configuration transition is not occurring, only one of the front master camera or the front slave camera may be actively capturing images. For ease of description, it is assumed that the master camera is active in this situation and the slave camera is inactive. The image capturing process of the front master camera is performed in cooperation with the image signal processor 300 based on an ISP configuration that will be referred to herein as "active ISP configuration." These settings for the active ISP configuration can be stored in a memory 340. As described above, there are a large number of parameters that may be specified in an ISP configuration, and some parameters may relate to the camera hardware system, while other parameters may relate to software processing of image pixel data.

In accordance with aspects of the present disclosure, images captured by the front master camera are processed in the image signal processor 300 to detect objects therein. In various embodiments, an object classification module 325 initially classifies objects in the captured images into high level classifications, such as, for example, signage and markings, automobiles, living creature, buildings, and greenery, among other things. In various embodiments, the high level classification can be determined based on moving status, size, and/or traffic information, among other things. For example, based on whether an object is moving or stationary, the object classification module 325 can narrow down the possibilities for classifying the object. The size may indicate that the detected object is small, medium, or large, and also contribute to narrowing down the possibilities for classifying the object. For example, a small object may be less than or equal to 3 feet, a medium size may be less than 7 feet, and a large size may be greater than or equal to 7 feet. The criterion for determining the size is provided as an example and can vary. In various embodiments, the object classification module 325 may classify an object in multiple categories if there is not enough information to classify the object in only one category.

The object classification or classifications are provided to the object matching module 330 along with the captured image data. In accordance with aspects of the present disclosure, the object matching module 330 can apply trained learning machines based on the object classification or classifications. Persons skilled in the art will understand the ways to train a machine learning system using training data and to implement a trained learning machine, such as a trained convolutional neural network. As an example, for an object classification of "living creature," the object matching module 330 can apply trained learning machines for identifying humans, dogs, and birds. For an object classification of automobile, the object matching module 330 can apply trained learning machines for identifying trucks, passenger vehicles, and motorcycles, for examples. Accordingly, the object module 330 may apply multiple trained learning machines. As persons skilled in the art will understand, each trained learning machine can provide an indication of its confidence in identifying the object. In various embodiments, the output of the trained learning machine that provides the highest confidence can be used by the object matching module 330 to identify an object.

As described above, if the environmental light conditions change, the active ISP configuration may no longer be suited to capturing images in the environmental light conditions. The search module 380 identifies an ISP configuration based on the environmental setting inferred from signals of the environmental light detectors 174. The ISP configuration identified by the searching module 380 will be referred to herein as "matched ISP configuration" and can be stored in a standby ISP memory 345.

When transitioning from the active ISP configuration to the matched ISP configuration, there is a chance to miss one or more captured images or there may be latency in processing one or more captured images because the transition generally takes time. Missing images and latency both may pose safety risks in autonomous operation. Additionally, switching the ISP configuration suddenly may cause certain objects to be suddenly re-classified and identified differently, and may cause unforeseen problems with how the autonomous vehicle should handle sudden changes in object identification. For example, a bicycle may suddenly be re-classified and identified as a human.

In accordance with aspects of the present disclosure, the image signal processor 300 includes an ISP transition controller 335 which communicates with the active ISP memory 340 and the standby ISP memory 345, among other things. The ISP transition controller 335 operates to transition the image signal processor 300 from using the active ISP configuration to the matched ISP configuration. As explained below, the ISP transition controller 335 replaces the active ISP configuration with the matched ISP configuration in a manner that reduces safety risks of the transition.

In accordance with aspects of the present disclosure, the ISP transition controller 335 can operate to activate the front slave camera and to associate the matched ISP configuration with the front slave camera. When the front slave camera is activated, both the front master camera and the front slave camera will be active. The front master camera can cooperate with the image signal processor 300 to capture images using the active ISP configuration, and the front slave camera can cooperate with the image signal processor to capture images using the matched ISP configuration. In the illustrated embodiment, capturing images with two separate cameras using two separate ISP configurations is implemented by a single image signal processor 300, which can have the technical capacity to handle both image capturing operations. In various embodiments, multiple image signal processors can be used (not shown).

During this transition, the first camera and the second camera operate simultaneously. As used herein, the term "simultaneous" means and includes operations that run in parallel. The term "simultaneous" includes multiple operations that run in parallel using the same processing resources such that portions of the multiple operations may be scheduled to the processing resources in an interleaved manner. In such an example, the operations still execute simultaneously because the processing resources are not fully completing one operation before beginning a different operation.

During the transition process when both the front master camera and the front slave camera are active, the images captured by both cameras can be temporarily stored in the video pipeline 315. The object classification module 325 and the object matching module 330 would perform their operations on both the images captured using the front master camera and the images captured using the front slave camera. In this manner, during the transition process, it is possible that the image signal processor 300 may identify a single object as two different things if the images captured using the front master camera/active ISP configuration and using the front slave camera/matched ISP configuration are sufficiently different. Thus, the process of transitioning the ISP configuration may introduce uncertainty, but it may introduce such uncertainty in a way that the autonomous vehicle 100 is expected to handle and is capable of handling. For example, the autonomous vehicle 100 may identify an object as either a human or a dog and may perform its operations based on both possibilities.

In accordance with aspects of the present disclosure, to complete the transition from the active ISP configuration to the matched ISP configuration, and after the autonomous vehicle has considered images from both the front master camera/active ISP configuration and the front slave camera/matched ISP configuration, the ISP transition controller 335 can copy the matched ISP parameters from the standby ISP memory 345 to the active ISP memory 340. While that copy occurs, the front slave camera/matched ISP configuration will continue to capture images, and the autonomous vehicle 100 will continue to operate based on such images. The front master camera may be inactive for a slight time, but dropping the image stream from the front master camera would not introduce a sudden change to the image controller 300 because the image controller 300 would already be considering the images from the front slave camera. This transition process enables the autonomous vehicle 100 to operate without dropping images and without latency in processing images. After the matched ISP configuration has been copied to the active ISP memory 345, both the front master camera and the front slave camera would capture images using the same ISP configuration, and such ISP configuration becomes the active ISP configuration. When the front master camera is operational after the transition process, the ISP transition controller 335 can deactivate the front slave camera.

Accordingly, described above herein are systems and methods for enabling an autonomous vehicle to respond to changes in environmental light conditions while reducing safety risks during such a transition. Variations of the described process are contemplated to be within the scope of the present disclosure. For example, in various embodiments, the ISP transition controller 335 may not copy the matched ISP configuration to the active ISP memory 340.

Rather, the ISP transition controller 335 may complete the transition by re-designating the memory 345 as the active ISP memory and re-designating the front slave camera as the front master camera, and re-designating the memory 340 as the standby ISP memory and re-designating the front master camera as the front slave camera. Then, the ISP transition controller 335 can deactivate the previous front master camera which was re-designated as the front slave camera. In this way, the front master camera and the front slave camera switch designations, and the memories 340, 345 also switch designations.

As another example, during one cycle from capturing an image to detecting objects in the captured image, the ISP transition controller 335 may refrain from copying the matched ISP configuration to the active ISP configuration memory 340. In this way, risk of missing one or more images can be further reduced. The matched ISP configuration may be copied to the active ISP memory 340 between two consecutive cycles but not during each cycle. Other variations are contemplated to be within the scope of the present disclosure.

In accordance with aspects of the present disclosure, the autonomous vehicle may not use the transition process in certain situations. For example, in various embodiments, the contents of the active ISP memory 340 may be replaced by the matched ISP configuration, without using the transition process, when no moving objects have been detected in the captured images for a predetermined period, when no humans or animals have been detected for the predetermined period, and/or when the autonomous vehicle is stopped. In other words, the active ISP configuration may be replaced in situations having lesser safety risk. The particular situations described above are exemplary, and other situations are contemplated to be within the scope of the present disclosure.

Figure 4:
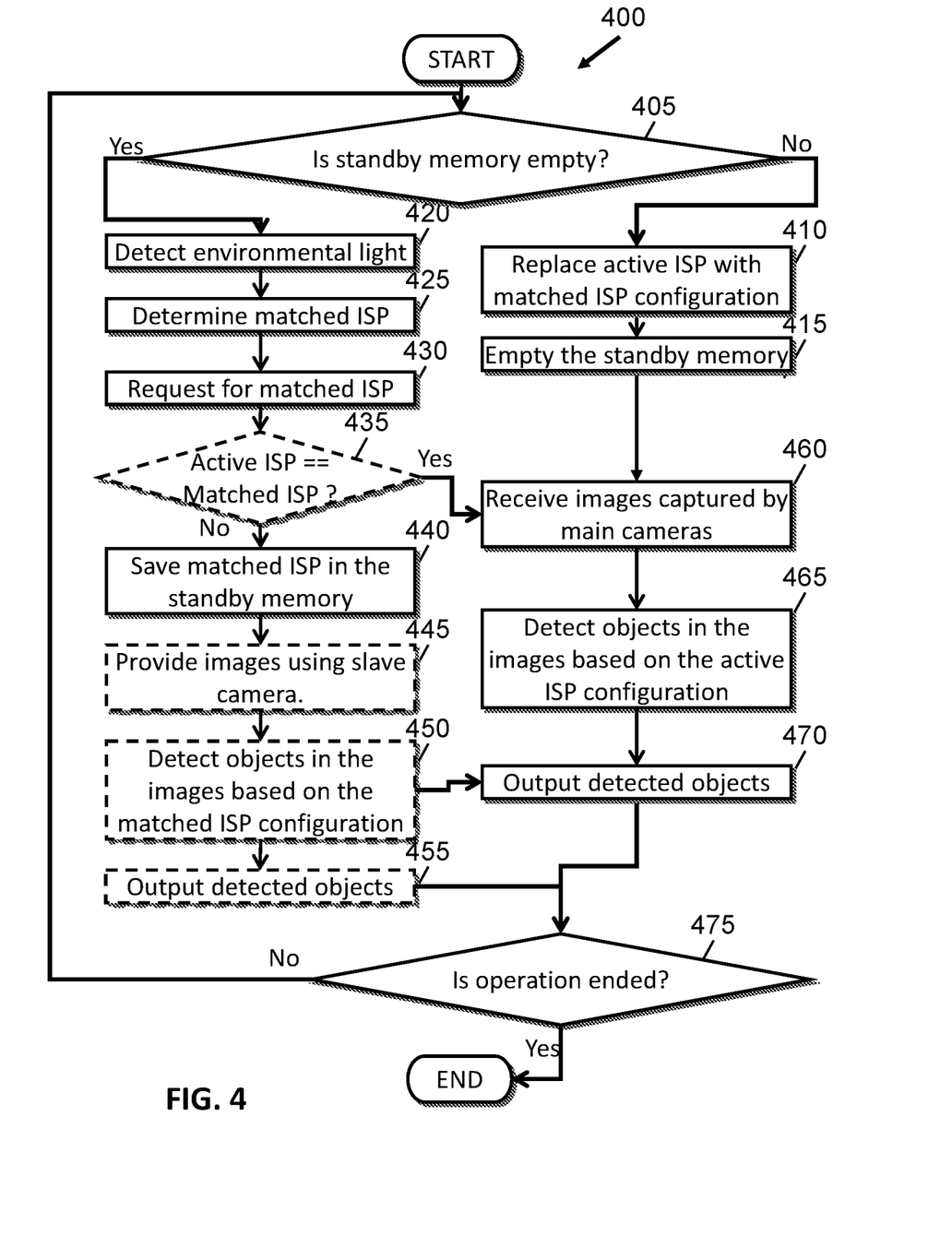
FIG. 4 is a flow diagram illustrating an exemplary operation involving an active ISP configuration and a matched ISP configuration, in accordance with aspects of the present disclosure.

FIG. 4 illustrates a method 400 for transitioning from an active ISP configuration to a matched ISP configuration with reduced safety risk. The method 400 begins with checking whether a standby memory, which is configured to store a matched ISP configuration, is empty in step 405. When it is determined that the standby memory is not empty, indicating that a matched ISP configuration is stored in the memory, the contents of the active ISP memory is replaced with the matched ISP configuration in step 410, such that the matched ISP configuration becomes the active ISP configuration. In embodiments, replacement of the active ISP configuration may occur immediately when there are no humans or moving objects detected in the images or when the autonomous vehicle is at a full stop. In other words, when there is reduced safety risk, the contents of the active ISP memory may be replaced with the matched ISP configuration. Otherwise, a transition operation as described above herein can be used, and such an operation will also be described in more detail in connection with FIG. 5.

When it is determined that the standby memory is empty, one or more environmental light detectors may detect environmental light conditions surrounding the autonomous vehicle in step 420. In step 425, the operation searches for an ISP configuration from among a plurality of ISP configurations, based on the detected environmental light. If an ISP configuration matching the environmental light conditions is identified, that ISP configuration is determined to be the matched ISP configuration.

In embodiments, if there is no ISP configuration matching the environmental light conditions, a default ISP configuration may be used (not shown). In various embodiments, the default ISP configuration may be suitable for many different environmental light conditions.

The image signal processor provides a request for the matched ISP configuration to the in step 430. Upon reception of the matched ISP configuration, it is determined whether or not the matched ISP configuration is equal to the active ISP configuration in step 435. When the active ISP configuration is determined to be equal to the matched ISP configuration, the operation proceeds to step 460, which is described later below. As shown by a dotted box, step 435 may be optional, and in various embodiments, step 440 may follow step 430.

When the active ISP configuration is determined not to be equal to the matched ISP configuration in step 435, the image signal processor saves the matched ISP configuration in a standby memory, in step 440.

In embodiments, steps 445-455 may be performed. In particular, the image signal processor may cooperate with a slave camera to provide images based on the matched ISP configuration, in step 445. The image signal processor may process the captured images and detect objects in the captured images in step 450. Then, in step 455, the detected objects may be used by the autonomous vehicle.

Referring back to step 430, when the active ISP configuration is determined to be equal to the matched ISP configuration, step 460 is performed. Further, after step 415, step 460 is performed to provide images using the main cameras in cooperation with the image signal processor, based on an active ISP configuration. In step 465, the image signal processor processes the images and detects objects in the images captured using by the main cameras. In step 470, the detected objects are used by the autonomous vehicle.

As described above, steps 435, 445, 450, and 455 may be optional, such as then a vehicle is stopped in traffic, among other situations. After steps 455 and 470, it is determined whether or not the operation has ended in step 475. When the operation is ended, the method 400 is ended. Otherwise, steps 405-475 are performed again until the operation is ended.

Figure 5:
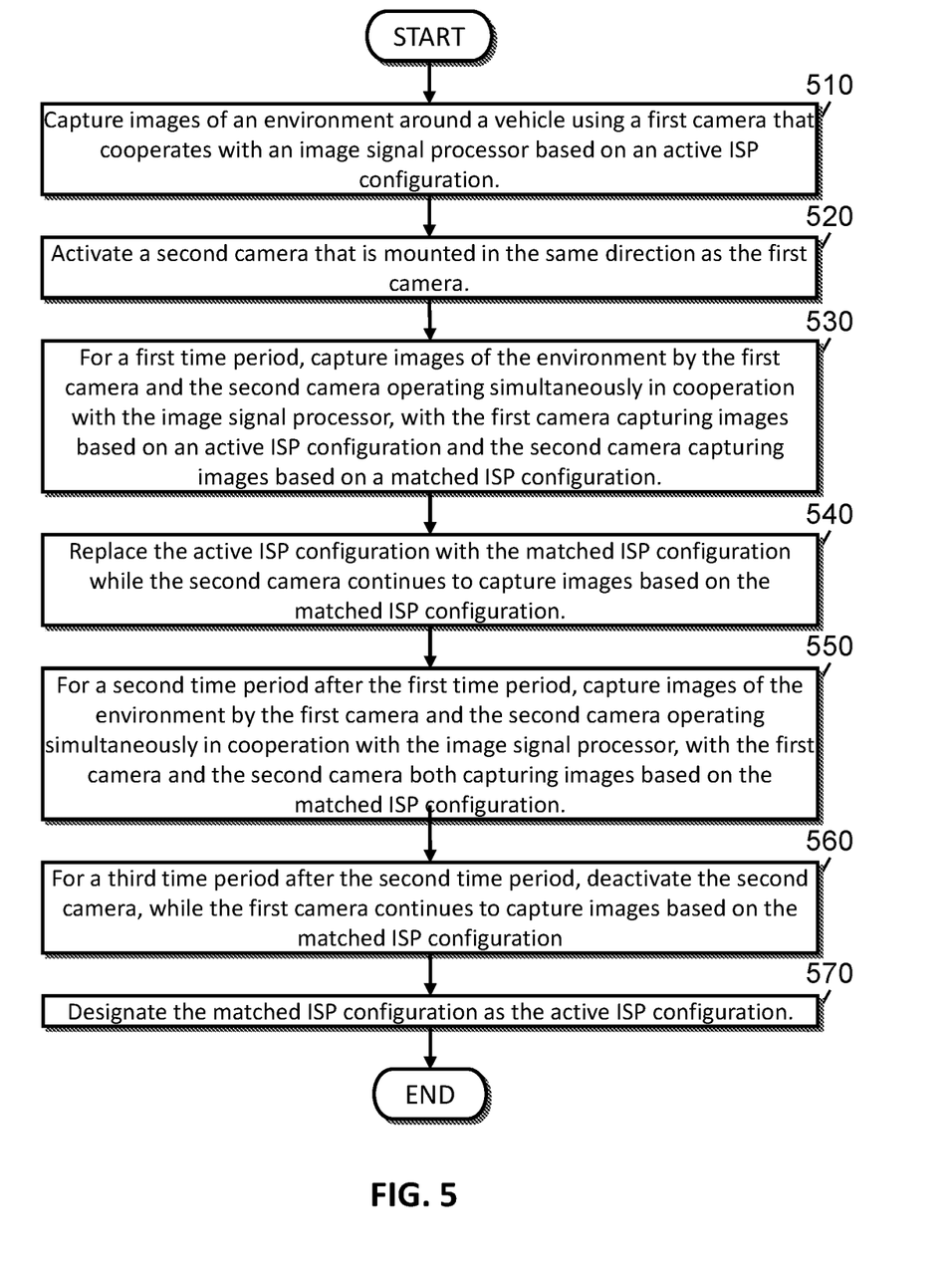
FIG. 5 is a flow diagram illustrating an exemplary operation for transitioning ISP configurations, in accordance with aspects of the present disclosure.

FIG. 5 is a flow diagram of an exemplary process for transitioning the ISP configuration. The illustrated operation relates to transitioning from capturing images of a field of view using an active image signal processor (ISP) configuration to capturing images of the field of view using a matched image signal processor (ISP) configuration that is different from the active ISP configuration. As explained below, the transitioning includes simultaneously using the first camera and the second camera and simultaneously using the active ISP configuration and the matched ISP configuration. As explained above herein, the term "simultaneous" means and includes operations that run in parallel. The term "simultaneous" includes multiple operations that run in parallel using the same processing resources such that portions of the multiple operations may be scheduled to the processing resources in an interleaved manner. In such an example, the operations still execute simultaneously because the processing resources are not fully completing one operation before beginning a different operation.

At step 510, the process captures images of an environment around a vehicle using a first camera (which is a main camera) that cooperates with an image signal processor based on an active ISP configuration. At step 520, the process activates a second camera (which is a redundant camera) that is mounted in the same direction as the first camera. At step 530, for a first time period, the process captures images of the environment by the first camera and the second camera operating simultaneously in cooperation with the image signal processor, with the first camera capturing images based on an active ISP configuration and the second camera capturing images based on a matched ISP configuration. At step 540, the process replaces the active ISP configuration for the first camera with the matched ISP configuration while the second camera continues to capture images based on the matched ISP configuration. At step 550, for a second time period after the first time period, the process captures images of the environment by the first camera and the second camera operating simultaneously in cooperation with the image signal processor, with the first camera and the second camera both capturing images based on the matched ISP configuration. At step 560, for a third time period after the second time period, the process deactivates the second camera (the redundant camera), while the first camera (the main camera) continues to capture images based on the matched ISP configuration.

By activating and using the second/redundant camera, the second camera helps seamlessly transition from the active ISP configuration to the matched ISP configuration for the first camera. In other words, the matched ISP configuration replaces the active ISP configuration for the first camera during the transition period from the first time period through the third time period. After the transition period ends and the second camera is deactivated at step 560, the matched ISP configuration is used by the first camera to capture images.

At step 570, the process designates or treats the matched ISP configuration as the active ISP configuration and the process ends. The step of designating the matched ISP configuration as the active ISP configuration operates to inform subsequent changes in environmental light as to which ISP configuration is active. For example, steps 420-435 of FIG. 4 are based on having a particular ISP configuration be designated as the active ISP configuration. The process of FIG. 5 is exemplary, and variations are contemplated to be within the scope of the present disclosure. In various embodiments, rather than steps 540-560 as shown in the FIG. 5, the process can instead deactivate the first camera, which becomes the redundant camera, while the second camera, as the new main camera, continues to capture images based on the matched ISP configuration, and thereafter, step 570 designates or treats the matched ISP configuration as the active ISP configuration, and the process ends. Other variations are contemplated to be within the scope of the present disclosure.

Figure 6:
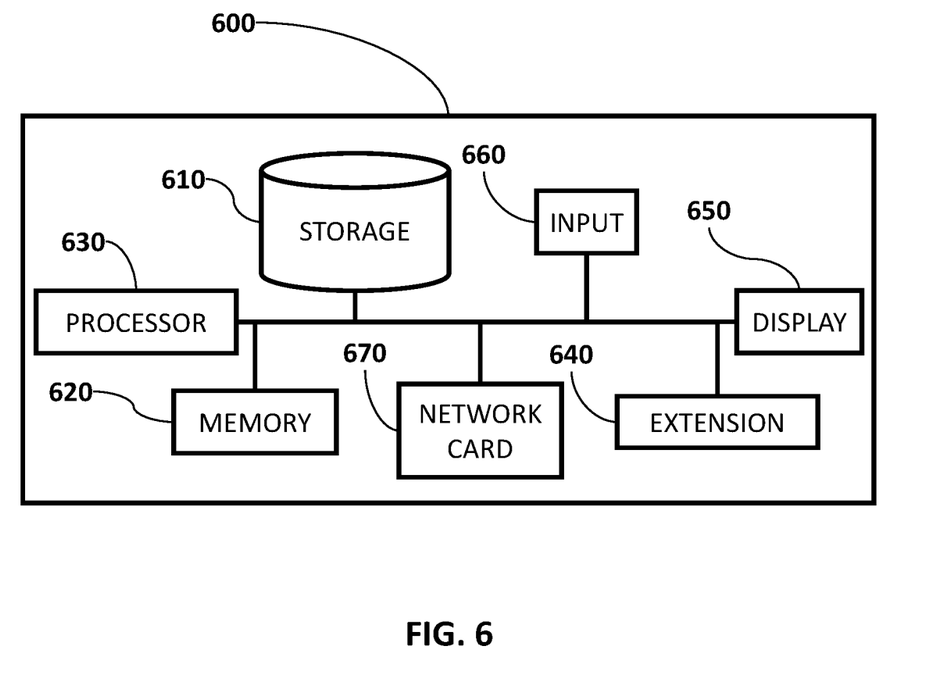
FIG. 6 is a block diagram for an exemplary processing system, in accordance with aspects of the present disclosure.

FIG. 6 is a block diagram for a digital processing device 600 representative of the vehicle controller 110 of FIG. 1 or the image signal processor 300 of FIG. 3, in accordance with embodiments of the present disclosure. The digital processing device 600 may be or may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and autonomous vehicles. Those skilled in the art will recognize that many smartphones are suitable for use in the system described herein. Suitable tablet computers include those with booklet, slate, and convertible configurations, known to those of skill in the art.

In some embodiments, the digital processing device 600 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing system 600 may include a storage 610. The storage 610 is one or more physical apparatus used to store data or programs on a temporary or permanent basis. In some embodiments, the storage 610 may be volatile memory and requires power to maintain stored information. In some embodiments, the storage 610 may be non-volatile memory and retains stored information when the digital processing system 600 is not powered. In some embodiments, the non-volatile memory includes flash memory. In some embodiments, the non-volatile memory includes dynamic random-access memory (DRAM). In some embodiments, the non-volatile memory includes ferroelectric random-access memory (FRAM). In some embodiments, the non-volatile memory includes phase-change random access memory (PRAM). In some embodiments, the storage 610 includes, by way of non-limiting examples, CD-ROMs, DVDs, flash memory devices, magnetic disk drives, magnetic tapes drives, optical disk drives, and cloud computing-based storage. In some embodiments, the storage 510 may be a combination of devices such as those disclosed herein.

The digital processing system 600 further includes a processor 630, an extension 640, a display 650, an input device 660, and a network card 670. The processor 630 executes instructions which implement tasks or functions of programs. When a user executes a program, the processor 630 reads the program stored in the storage 610, loads the program into the memory 620, and executes instructions prescribed by the program. In various embodiments, the processor 630 is an image signal processor, and the instructions cause the digital processing system 600, and/or the vehicle containing it, to perform some or all of the operations described above herein.

The processor 630 may be or may include a microprocessor, central processing unit (CPU), application specific integrated circuit (ASIC), arithmetic coprocessor, graphic processor, and/or image signal processor, each of which is electronic circuitry within a computer that carries out instructions of a computer program by performing the basic arithmetic, logical, control and input/output (I/O) operations specified by the instructions. In various embodiments, the process 630 is an image signal processor.

In embodiments, the extension 640 may include several ports, such as one or more universal serial buses (USBs), IEEE 1394 ports, parallel ports, and/or expansion slots such as peripheral component interconnect (PCI) and PCI express (PCIe). The extension 640 is not limited to the list but may include other slots or ports that can be used for appropriate purposes. The extension 640 may be used to install hardware or add additional functionalities to a computer that may facilitate the purposes of the computer. For example, a USB port can be used for adding additional storage to the computer and/or an IEEE 1394 may be used for receiving moving/still image data.

In some embodiments, the display 650 may be a cathode ray tube (CRT), a liquid crystal display (LCD), or light emitting diode (LED). In some embodiments, the display 650 may be a thin film transistor liquid crystal display (TFT-LCD). In some embodiments, the display 550 may be an organic light emitting diode (OLED) display. In various some embodiments, the OLED display is a passive-matrix OLED (PMOLED) or active-matrix OLED (AMOLED) display. In some embodiments, the display 650 may be a plasma display. In some embodiments, the display 650 may be a video projector. In some embodiments, the display may be interactive (e.g., having a touch screen or a sensor such as a camera, a 3D sensor, a LiDAR, a radar, etc.) that can detect user interactions/gestures/responses and the like. In still some embodiments, the display 650 is a combination of devices such as those disclosed herein.

In various embodiments, a user may input and/or modify data via the input device 660, which may be or may include a keyboard, a mouse, or any other device with which the use may input data. The display 650 displays data on a screen of the display 650. The display 650 may be a touch screen so that the display 550 can be used as an input device. In various embodiments, the input device 660 can include one or more cameras and/or light detection devices, such as those described above herein.

The network card 670 is used to communicate with other computing devices, wirelessly or via a wired connection. Through the network card 670, the autonomous vehicle may obtain, modify, and/or update data from and to a managing server.

The embodiment illustrated in FIG. 6 is exemplary, and variations are contemplated to be within the scope of the present disclosure. For example, in various embodiments, the digital processing system 600 may not include a display 650. Rather, a portable display can be connected to the extension port 640 to access and/or diagnose the digital processing system 600 or the vehicle containing it.

Accordingly, described herein are systems and methods for image capturing in which image capture parameters are dynamically transitioned to adjust to changing environmental light conditions.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, C#, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system comprising:
   at least one image signal processor;
   a first camera configured to cooperate with the at least one image signal processor to capture images of an environment around a vehicle; and
   a second camera configured to cooperate with the at least one image signal processor to capture images of the environment around the vehicle, the second camera and the first camera being mounted to the vehicle in a same direction,
   wherein the at least one image signal processor is configured to transition from capturing images of a field of view using an active image signal processor (ISP) configuration to capturing images of the field of view using a matched image signal processor (ISP) configuration, wherein the matched ISP configuration is different from the active ISP configuration, and
   wherein the transition includes simultaneously using the first camera and the second camera and simultaneously using the active ISP configuration and the matched ISP configuration.

2. The system of claim 1, further comprising:
   a detector configured to capture environmental light of the environment; and
   a memory storing a plurality of image signal processor configurations,
   wherein the matched ISP configuration is selected from among the plurality of image signal processor configurations based on the environmental light.

3. The system of claim 2, further comprising a trained learning machine that classifies the environment based on the environmental light, wherein the matched ISP configuration is selected from among the plurality of image signal processor configurations based on classification of the environment.

4. The system of claim 1, wherein, for a first time period during the transition, the first camera cooperates with the at least one image signal processor to capture first images of the field of view based on the active ISP configuration and, simultaneously, the second camera cooperates with the at least one image signal processor to capture second images of the field of view based on the matched ISP configuration.

5. The system of claim 4, further comprising a trained learning machine configured to process the first images of the field of view and the second images of the field of view to identify an object in the field of view.

6. The system of claim 5, wherein the trained learning machine provides a first identification for the object based on the first images and provides a second identification for the object based on the second images, wherein the first identification is different from the second identification.

7. The system of claim 4, wherein, for a second time period during the transition that is after the first time period, the first camera cooperates with the at least one image signal processor to capture third images of the field of view based on the matched ISP configuration, and, simultaneously, the second camera cooperates with the at least one image signal processor to capture fourth images of the field of view based on the matched ISP configuration.

8. The system of claim 7, wherein, for a third time period during the transition that is after the second time period, the second camera is deactivated.

9. The system of claim 4, wherein, for a second time period during the transition that is after the first time period, the first camera is deactivated.

10. A method comprising:
capturing, by a first camera in cooperation with at least one image signal processor, images of an environment around a vehicle;
capturing, by a second camera in cooperation with the at least one image signal processor, images of the environment around the vehicle, wherein the second camera and the first camera are mounted to the vehicle in a same direction; and
transitioning from capturing images of a field of view using an active image signal processor (ISP) configuration to capturing images of the field of view using a matched image signal processor (ISP) configuration, wherein the matched ISP configuration is different from the active ISP configuration,
wherein the transitioning includes simultaneously using the first camera and the second camera and simultaneously using the active ISP configuration and the matched ISP configuration.

11. The method of claim 10, further comprising:
capturing, by a detector, environmental light of the environment;
accessing a memory storing a plurality of image signal processor configurations; and
selecting the matched ISP configuration from among the plurality of image signal processor configurations based on the environmental light.

12. The method of claim 11, further comprising classifying the environment based on the environmental light using a trained learning machine, wherein selecting the matched ISP configuration includes selecting the matched ISP configuration from among the plurality of image signal processor configurations based on the classification.

13. The method of claim 10, wherein the transitioning further includes, for a time period during the transition, capturing first images of the field of view by the first camera cooperating with the at least one image signal processor based on the active ISP configuration, and, simultaneously, capturing second images of the field of view by the second camera cooperating with the at least one image signal processor based on the matched ISP configuration.

14. The method of claim 13, further comprising processing the first images of the field of view and the second images of the field of view, by a trained learning machine, to identify an object in the field of view.

15. The method of claim 14, wherein the trained learning machine provides a first identification for the object based on the first images and provides a second identification for the object based on the second images, wherein the first identification is different from the second identification.

16. The method of claim 13, wherein the transitioning further includes, for a second time period during the transition that is after the time period, capturing third images of the field of view by the first camera cooperating with the at least one image signal processor based on the matched ISP configuration, and, simultaneously, capturing fourth images of the field of view by the second camera cooperating with the at least one image signal processor based on the matched ISP configuration.

17. The method of claim 16, wherein the transitioning further includes, for a third time period during the transition that is after the second time period, deactivating the second camera.

18. The method of claim 13, wherein the transitioning further includes, for a second time period during the transition that is after the time period, deactivating the first camera.

19. A non-transitory computer readable medium of a system having a first camera, a second camera, and at least one image signal processor, the computer readable medium including instructions which, when executed by the at least one image signal processor, cause the system to perform a process comprising:
capturing, by the first camera in cooperation with at least one image signal processor, first images of an environment around a vehicle;
capturing, by the second camera in cooperation with the at least one image signal processor, second images of the environment around the vehicle, wherein the second camera and the first camera are mounted to the vehicle in a same direction; and
transitioning from capturing images of a field of view using an active image signal processor (ISP) configuration to capturing images of the field of view using a matched image signal processor (ISP) configuration, wherein the matched ISP configuration is different from the active ISP configuration,
wherein the transitioning includes simultaneously using the first camera and the second camera and simultaneously using the active ISP configuration and the matched ISP configuration.

20. The non-transitory computer readable medium of claim 19, wherein the transitioning further includes, for a time period during the transition, capturing the first images by the first camera cooperating with the at least one image signal processor based on the active ISP configuration, and, simultaneously, capturing the second images by the second camera cooperating with the at least one image signal processor based on the matched ISP configuration.

\* \* \* \* \*